US012327165B2

(12) United States Patent
Russo et al.

(10) Patent No.: US 12,327,165 B2
(45) Date of Patent: Jun. 10, 2025

(54) VISUAL PRESENTATION OF QUANTUM-CLASSICAL INTERFACE IN A USER EXPERIENCE

(71) Applicant: INTERNATIONAL BUSINESS MACHINES CORPORATION, Armonk, NY (US)

(72) Inventors: Joseph Anthony Russo, Westford, MA (US); Jill Sherman, Northfield, IL (US); Christopher P. Wilczak, Chicago, IL (US); Jonathan Ralph, Rosemount, MN (US); Joshua Totte, Santa Monica, CA (US); Megan Arthur, Yorktown Heights, NY (US); Erin McPhail, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 334 days.

(21) Appl. No.: 17/548,518

(22) Filed: Dec. 11, 2021

(65) Prior Publication Data
US 2023/0186141 A1    Jun. 15, 2023

(51) Int. Cl.
*G06N 10/80* (2022.01)
*G06F 3/04817* (2022.01)

(52) U.S. Cl.
CPC ......... *G06N 10/80* (2022.01); *G06F 3/04817* (2013.01)

(58) Field of Classification Search
CPC ........ G06N 10/00; G06N 10/20; G06N 10/40; G06N 10/60; G06N 10/70; G06N 10/80
See application file for complete search history.

(56) References Cited

U.S. PATENT DOCUMENTS

| | | | | |
|---|---|---|---|---|
| 7,681,133 | B2 * | 3/2010 | Yaseen | G06Q 10/00 |
| | | | | 715/740 |
| 8,195,596 | B2 * | 6/2012 | Rose | G06N 10/00 |
| | | | | 706/62 |

(Continued)

FOREIGN PATENT DOCUMENTS

| | | | |
|---|---|---|---|
| AU | 2020102068 A4 | * | 10/2020 |
| CN | 114239841 A | * | 3/2022 |

(Continued)

OTHER PUBLICATIONS

Screen captures from YouTube video clip entitled "A Quantum Marriage: Hybrid quantum-classical optimization meets circuit-free computing," 27 pages with transcript, uploaded on Jun. 1, 2021 by user "Quantum Interactions". Retrieved from Internet: <https://www.youtube.com/watch?v=hRcV7f9xoaA> (Year: 2121).*

(Continued)

*Primary Examiner* — Benjamin Smith
(74) *Attorney, Agent, or Firm* — Intelletek Law Group, PLLC; Gabriel Daniel, Esq.

(57) ABSTRACT

A quantum computing interface system is provided. The system presents a classical computing user interface (UI) element to represent a classical computing domain. An altered appearance of the classical computing UI element indicates a classical domain event occurring in the classical computing domain. The system presents a quantum computing UI element to represent a quantum computing domain. An altered appearance of the quantum computing UI element indicates a quantum domain event occurring in the quantum computing domain. The system presents a data connection UI element to represent a data connection between the classical computing domain and the quantum computing domain. An altered appearance of the data connection UI element indicates a data flow event related to data (Continued)

transition between the classical computing domain and the quantum computing domain.

17 Claims, 10 Drawing Sheets

(56) References Cited

U.S. PATENT DOCUMENTS

| | | | | |
|---|---|---|---|---|
| 8,983,303 | B2* | 3/2015 | Meyers | B82Y 10/00 398/140 |
| D732,575 | S | 6/2015 | Vardy | |
| 9,270,385 | B2* | 2/2016 | Meyers | H04B 10/70 |
| 9,300,554 | B1* | 3/2016 | Kosai | H04L 43/16 |
| D753,686 | S | 4/2016 | Vardy et al. | |
| 9,329,775 | B2* | 5/2016 | Nakamura | G06F 3/04883 |
| 10,142,353 | B2* | 11/2018 | Yadav | H04L 63/0227 |
| 10,222,416 | B1* | 3/2019 | Inamdar | H10N 60/12 |
| 10,592,626 | B1* | 3/2020 | Pednault | G06F 30/39 |
| 10,963,125 | B2* | 3/2021 | Gupta | G06F 3/017 |
| 10,977,570 | B2* | 4/2021 | Smith | G06F 9/4881 |
| 11,087,232 | B2* | 8/2021 | Ducore | G06F 15/80 |
| 11,106,845 | B2* | 8/2021 | Pednault | G06F 30/392 |
| 11,170,137 | B1* | 11/2021 | Richardson | G06F 30/20 |
| 11,270,220 | B1* | 3/2022 | Richardson | G06F 9/5066 |
| 11,409,426 | B2* | 8/2022 | Thom | G06F 3/04817 |
| 11,528,283 | B2* | 12/2022 | Yadav | H04L 63/02 |
| 11,574,560 | B2* | 2/2023 | Limberg | G09B 23/186 |
| 11,605,016 | B2* | 3/2023 | Heckey | G06F 9/54 |
| 11,605,033 | B2* | 3/2023 | Bolt | G06N 10/00 |
| 11,688,111 | B2* | 6/2023 | Wang | G06F 3/0481 715/711 |
| 11,704,012 | B2* | 7/2023 | Thom | G06F 3/04817 715/771 |
| 11,727,299 | B2* | 8/2023 | Smith | G06N 10/80 718/102 |
| D1,002,664 | S* | 10/2023 | Hanington | D14/489 |
| 11,775,855 | B2* | 10/2023 | Richardson | G06F 9/5066 718/104 |
| 11,809,839 | B2* | 11/2023 | Lyden | G06F 8/31 |
| 11,847,533 | B2* | 12/2023 | Mentovich | G06F 9/5044 |
| 11,907,092 | B2* | 2/2024 | Krneta | G06F 11/3495 |
| 11,907,804 | B2* | 2/2024 | Rahman | B82Y 10/00 |
| 2003/0169041 | A1* | 9/2003 | Coury | G06N 10/20 324/307 |
| 2007/0226637 | A1* | 9/2007 | Yaseen | G06Q 10/00 715/705 |
| 2008/0082933 | A1* | 4/2008 | Howard | G06F 9/5072 712/30 |
| 2008/0176750 | A1* | 7/2008 | Rose | B82Y 10/00 505/170 |
| 2012/0042256 | A1* | 2/2012 | Jamjoom | G06F 9/5011 718/104 |
| 2013/0308956 | A1* | 11/2013 | Meyers | H04B 10/70 977/933 |
| 2014/0019879 | A1* | 1/2014 | Krajec | G06F 3/0481 715/753 |
| 2014/0253484 | A1* | 9/2014 | Nakamura | G06F 3/04883 345/173 |
| 2015/0055961 | A1* | 2/2015 | Meyers | G06N 10/00 398/140 |
| 2016/0170811 | A1* | 6/2016 | Peacock | G06F 9/52 718/106 |
| 2016/0232457 | A1* | 8/2016 | Gray | G06F 16/26 |
| 2016/0380851 | A1* | 12/2016 | Kosai | G06F 16/24578 715/735 |
| 2018/0260245 | A1* | 9/2018 | Smith | G06F 9/542 |
| 2018/0365585 | A1* | 12/2018 | Smith | G06N 10/00 |
| 2019/0102496 | A1* | 4/2019 | Bishop | G06F 9/453 |
| 2020/0026551 | A1* | 1/2020 | Ducore | G06F 9/4843 |
| 2020/0104739 | A1* | 4/2020 | Sharma | G06N 10/80 |
| 2020/0110851 | A1* | 4/2020 | Pednault | G06N 10/00 |
| 2020/0167515 | A1* | 5/2020 | Pednault | G06F 30/30 |
| 2020/0301562 | A1* | 9/2020 | Gupta | G06N 10/00 |
| 2020/0327269 | A1* | 10/2020 | Pond | G06F 30/25 |
| 2020/0335011 | A1* | 10/2020 | Limberg | G09B 9/08 |
| 2020/0342344 | A1* | 10/2020 | Gambetta | G06N 20/00 |
| 2021/0004365 | A1* | 1/2021 | Kelly | G06F 16/2365 |
| 2021/0132969 | A1* | 5/2021 | Smith | G06N 10/00 |
| 2021/0158199 | A1* | 5/2021 | Heckey | G06F 9/54 |
| 2021/0158232 | A1* | 5/2021 | Bolt | G06N 10/00 |
| 2021/0174237 | A1* | 6/2021 | Mentovich | G06F 13/4022 |
| 2021/0263643 | A1* | 8/2021 | Thom | G06F 8/34 |
| 2021/0287773 | A1* | 9/2021 | Lam | G06F 9/3005 |
| 2021/0311442 | A1* | 10/2021 | Biercuk | G06N 10/40 |
| 2021/0357799 | A1* | 11/2021 | Ducore | G06F 15/80 |
| 2021/0406752 | A1* | 12/2021 | Smith | G06F 9/5027 |
| 2022/0036610 | A1* | 2/2022 | Wang | G06N 5/00 |
| 2022/0051112 | A1* | 2/2022 | Wang | G06N 5/022 |
| 2022/0084085 | A1* | 3/2022 | Rigetti | H04L 12/1403 |
| 2022/0188686 | A1* | 6/2022 | Richardson | G06F 9/5066 |
| 2022/0215279 | A1* | 7/2022 | Rahman | B82Y 20/00 |
| 2022/0309371 | A1* | 9/2022 | Singh | G06N 10/00 |
| 2022/0391081 | A1* | 12/2022 | Thom | G06N 10/20 |
| 2022/0414286 | A1* | 12/2022 | Griffin | G06N 10/80 |
| 2022/0414513 | A1* | 12/2022 | Niroula | G06N 10/40 |
| 2023/0066093 | A1* | 3/2023 | Coady | G06F 40/143 |
| 2023/0095267 | A1* | 3/2023 | Coady | G06N 10/00 716/100 |
| 2023/0110628 | A1* | 4/2023 | Heckey | G06N 10/00 |
| 2023/0153219 | A1* | 5/2023 | Krneta | G06N 10/00 709/224 |
| 2023/0244459 | A1* | 8/2023 | Zou | G06F 8/447 717/140 |
| 2023/0325730 | A1* | 10/2023 | Bolt | G06F 9/455 705/7.11 |
| 2023/0419141 | A1* | 12/2023 | Smith | G06F 9/5027 |
| 2024/0086749 | A1* | 3/2024 | Richardson | G06F 9/5066 |
| 2024/0118797 | A1* | 4/2024 | Thom | G06F 3/04817 |
| 2024/0428110 | A1* | 12/2024 | Te Raa | H04L 9/0852 |

FOREIGN PATENT DOCUMENTS

| | | | | |
|---|---|---|---|---|
| CN | 113010302 B | * | 11/2022 | G06F 9/5038 |
| CN | 116542338 A | * | 8/2023 | |
| WO | WO-2020081805 A1 | * | 4/2020 | |
| WO | WO-2023080786 A1 | * | 5/2023 | G06F 9/5044 |

OTHER PUBLICATIONS

Berti, A. et al., "Visualizing Quantum Computation, From Zero to Understand What the Hack is Happening!" https://towardsdatascience.com/visualizing-quantum-computation-7f2c911b0a63; downloaded Sep. 11, 2021; 20 pgs.

Disclosed Anonymously, "Quantum Developer Visualization Tool (QDVT)"; IP.com (2020); 8 pgs.

Lamy, J., "Dynamic Software Visualization of Quantum Algorithms with Rainbow Boxes:"; International Conference on Information Visualization Theory and Applications (IVAPP-2019), 10 pgs Prague, Czech Republic.

Lin, S. et al., "QuFlow: Visualizing Parameter Flow in Quantum Circuits for Understanding Quantum Computation"; IEEE Scientific Visualization Conference (SciVis—2018); 5 pgs.

Mitchell, A., "Getting Started with Qiskit (explained by a software developer, not a quantum physicist)"; [downloaded Sep. 11, 2021], https://medium.com/queen-of-qiskit/getting-started-with-qiskitexplained-by-a-software-developer-not-a-quantum-physicist-b8ba820685e5; 14 pgs.

Web Article, "What is the difference between Bloch's sphere and IBM's Q-sphere?", Quantum Computing Stackexchange, [download Sep. 11, 2021], https://quantumcomputing.stackexchange.com/questions/17212/what-is-the-difference between-blochssphere-and-ibms-q-sphere; 5 pgs.

Wikipedia. "Bloch sphere", retrieved from web https://en.wikipedia.org/wiki/Bloch_sphere, dated Mar. 12, 2025, 9 pages.

Wikipedia. "Quantum circuit", retrieved from web https://en.wikipedia.org/wiki/Quantum_circuit, dated Mar. 12, 2025, 9 pages.

* cited by examiner

VISUAL PRESENTATION OF QUANTUM-CLASSICAL INTERFACE IN A USER EXPERIENCE

BACKGROUND

Technical Field

The present disclosure generally relates to quantum computing.

Description of the Related Arts

Quantum computing is a type of computation that harnesses the collective properties of quantum states, such as superposition, interference, and entanglement, to perform calculations. The devices that perform quantum computations are known as quantum computers. They are believed to be able to solve certain computational problems substantially faster than classical computers.

A quantum computing system with its unique way of functioning, though powerful, cannot readily process user inputs and produce useful outputs without the aid of classical computing devices. A useful quantum computing system therefore has to transition data between classical and quantum domains. The actions involved in such transitions are often not communicated and left to the users to fathom on their own.

SUMMARY

Some embodiments provide a quantum computing interface system. The system presents a classical computing user interface (UI) element to represent a classical computing domain. An altered appearance of the classical computing UI element is used to show a classical domain event occurring in the classical computing domain. The system presents a quantum computing UI element to represent a quantum computing domain. An altered appearance of the quantum computing UI element is used to show a quantum domain event occurring in the quantum computing domain. The system presents a data connection UI element to represent a data connection between the classical computing domain and the quantum computing domain. An altered appearance of the data connection UI element is used to show a data flow event related to data transition between the classical computing domain and the quantum computing domain.

In some embodiments, the classical domain event is a real-time event occurring in a classical computing device and the quantum domain event is a real-time event occurring in a quantum computing device. In some embodiments, the classical computing UI element comprises one or more rectangular graphical elements and the quantum computing UI element comprises one or more circular or elliptical elements, and each line forming the classical computing UI element is a line without curvature and each line forming the quantum computing UI element has a curvature.

The classical domain UI element, the quantum domain UI element, and the data connection UI element may be associated with a first computing job to be performed in the quantum domain, and the first, second, and data connection UI elements are jointly used to show a status of the first computing job. In some embodiments, the system presents a queue of different computing jobs that includes the first computing job, and each member of the queue has at least three UI elements that correspond to the classical computing domain, the quantum computing domain, and the data connection between the classical computing domain and the quantum computing domain, wherein the UI elements of each member are jointly used to show a status of a computing job to be performed in the quantum domain. In some embodiments, the system also provides an indication of a number of qubits used for the first computing job in the quantum computing domain, an indication of a number of qubits in quantum entanglement for the first computing job, or an identification of qubits used for the first computing job. The system may also report a completion status of the computing job (e.g., percentage of job completion) and/or an error detected in the quantum computing domain or in the classical computing domain during execution of the computing job.

In some embodiments, a first appearance of the quantum computing UI element is used to indicate the first computing job waiting to be computed in quantum domain, a second appearance of the quantum computing UI element is used to indicate a quantum computation for the first computing job in progress, and a third appearance of the quantum computing UI element is used to indicate a completion of the quantum computation for the first computing job. The completion of the quantum computation may correspond to a measurement of one or more qubits being taken for the first computing job. In some embodiments, a first appearance of the data connection UI element indicates no data flow from the classical computing domain to the quantum computing domain for the first computing job, a second appearance of the data connection UI element is indicates data being transmitted to the quantum computing domain to be encoded into qubits for the first computing job, a third appearance of the data connection UI element indicates data being transmitted to the classical computing domain for the first computing job. The second appearance of the data connection UI element may include a sinusoidal wave to indicate a transition from the classical computing domain to the quantum computing domain. The third appearance of the third UI element may include a straight line or a rectangular wave to indicate a transition from the quantum computing domain to the classical computing domain.

In some embodiments, a selection of the classical computing UI element is interpreted as starting the first computing job, and a selection of the quantum computing UI element is interpreted as proceeding to quantum computing for the first computing job. In some embodiments, the system allows a selection of whether computation in the quantum computing domain takes place in a quantum computing simulator or in a physical quantum computing device, and the system presents an indication of whether computation in the quantum computing domain takes place in a quantum computing simulator or in a physical quantum computing device.

By virtue of the teachings herein the back-and-forth dataflow between a classical and quantum device is visually understandable and recognizable. Furthermore, the user may use the system to view and interact with the progress of a quantum computing job.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a quantum computing interface system. The system depicts or represents the actions involved in the data transitions between a classical computing system and a quantum computing system. In some embodiments, the system provides a touch point presentation having visual and auditory components that correspond to data flow operations between the classical computing system and the quantum computing system. The disclosed system creates a common experience of the communication exchange—the back and forth dataflow—between classical and quantum computing so that the process is visually understandable and recognizable to audiences who are not skilled in quantum computation.

Figure 1:
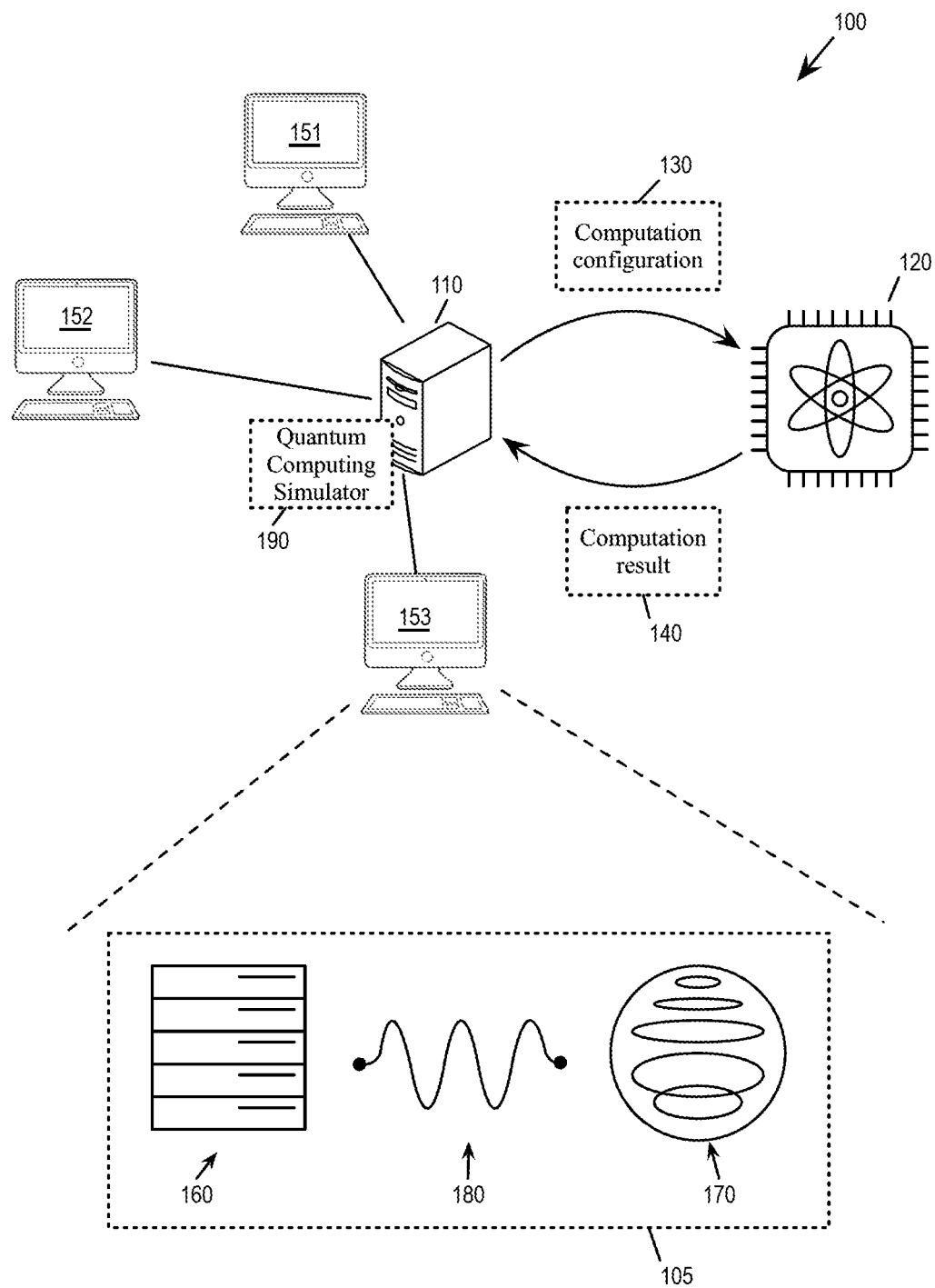
FIG. 1 conceptually illustrates a computing system having a quantum computing backend.

FIG. 1 conceptually illustrates a computing system 100 having a quantum computing backend. As illustrated, the computing system 100 includes a classical computing system 110 and a quantum computing system 120. The classical computing system 110 includes one or more classical computing devices for handling tasks in the classical domain. Specifically, the classical computing system 110 performs front end tasks such as receives computing jobs from one or more user devices 151-153, queues them if necessary, and dispatches the computing jobs to the quantum computing system 120. The classical computing system 110 is also responsible for generating and/or relaying computation configuration data 130 to the quantum computing system 120 for each computing job. In some embodiments, the classical computing system 110 preprocess user data or user algorithm in the classical domain into configuration data for implementing quantum gates or algorithms in the quantum domain. Examples of the computation configuration data 130 of a computing job may include the selection of qubits and the specification of the quantum algorithm for the computing job. The classical computing system 110 can also receive the computation result 140 (e.g., quantum measurements) of a computing job generated by the quantum computing system and convert the received measurements into useful user data. In some embodiments, the classical computing system 110 reports errors, including errors detected by the quantum computing system 120 and errors detected by the classical computing system 110.

The quantum computing system 120 may include one or more quantum computing devices for performing backend computing tasks for a computing job in the quantum computing domain. The quantum computing system 120 configures one or more qubits according to the configuration data 130 for the computing job. The configuration data 130 may include specification of a quantum algorithm or a quantum circuit, as well as how many or which qubits are to be quantum entangled. The quantum computing system 120 can also perform quantum measurements of the qubits and report the measurements as the computation result 140 to the classical computing system 110.

The classical computing system 110 allows user access through user devices 151-153 or through its own user interface (so that the classical computing system 110 act as a user device). A user may use a user device to submit computing jobs, observe the progress of the submitted computing jobs, interact with the progression of the submitted computing job, and view or use the result of the computing job (e.g., through a graphical user interface at a display device or touchscreen.) In some embodiments, such a user device (e.g., the user device 153) may operate a quantum computing interface system 105 as its user interface.

In some embodiments, the quantum computing interface system 105 presents at least three user interface (UI) elements at a display device or a touch screen. The system uses a first user UI element or item 160 (classical computing UI element) to represent a classical computing domain, a second UI element 170 (quantum computing UI element) to represent a quantum computing domain, and a third UI element 180 (data connection UI element) to represent a data connection between the classical computing domain and the quantum computing domain. In the context of FIG. 1 and the computing system 100, the classical computing domain refers to data and computation handled by the classical computing system 110, while the quantum computing domain refers to data and computation handled by the classical computing system 120.

The juxtaposition of the three UI elements visually indicates that the classical and quantum systems working together, as bits are encoded from a classical device into qubits. In some embodiments, the transition from a classical binary state to a quantum analog state is represented graphically to reflect the duality of light as both particle and wave through visualization of pulses.

In the example, as well as in some embodiments, the classical computing UI element 160 may include one or more rectangular graphical elements to represent the classical computing domain, while the quantum computing UI element 170 may include one or more circular or elliptical or spherical elements to represent the quantum computing domain. In some embodiments, each line forming the classical computing UI element is a line without curvature (straight line or line segments) and each line forming the quantum computing UI element has a curvature.

In some embodiments, an altered appearance of the classical computing UI element 160 is used to show an event occurring in the classical computing domain, an altered appearance of the quantum computing UI element 170 is used to show an event occurring in the quantum computing domain, and an altered appearance of the data connection UI element 180 is used to show an event related to data transition between the classical computing domain and the quantum computing domain. In some embodiments, such events are real-time events detected by a classical computing device in the classical computing system 110 and/or a quantum computing device in the quantum computing system 120.

In some embodiments, the system uses the UI elements 160, 170, 180 to show a status of a computing job. For example, the appearance of the classical computing UI element 160 may be altered to represent operations taking place in the classical computing domain, the appearances of the quantum computing UI element 170 can be altered to represent events in the quantum computing domain, and the appearance of the data connection UI element 180 can be altered to represent data flow between the classical computing domain and the quantum computing domain. The change of appearance of a UI item may involve changing shapes, having an additional overlay, or being animated. In some embodiments, change in appearance of an UI element may be accompanied by auditory cues generated by the interface system 105.

Figure 2A:
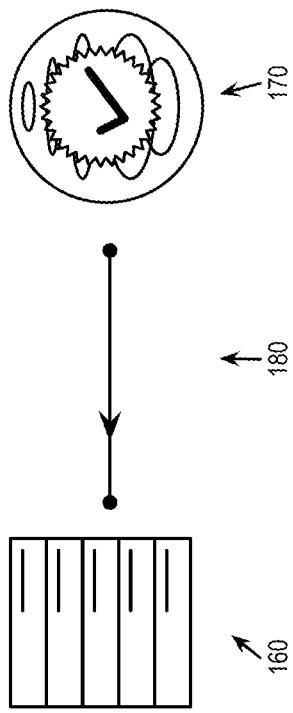
FIGS. 2A-D illustrate examples of altering the appearance of the quantum computing UI element to represent real-time events in the quantum computing domain, consistent with an exemplary embodiment.
Figure 2C:
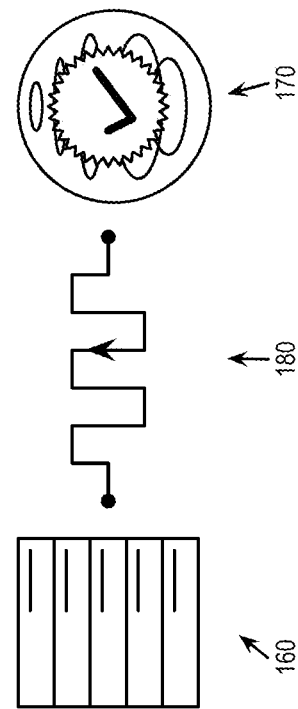
Figure 2B:
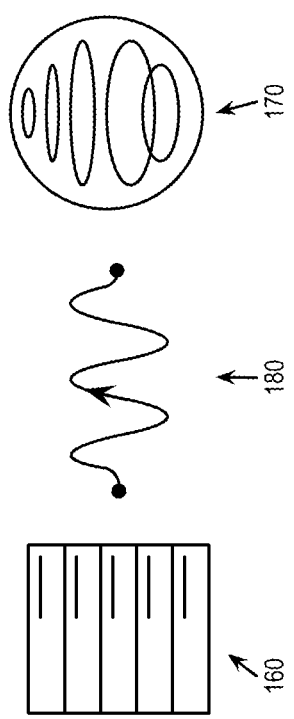

FIGS. 2A-D illustrate examples of altering the appearance of the quantum computing UI element to represent real-time events in the quantum computing domain, consistent with an exemplary embodiment. FIG. 2A shows the data connection UI element 180 having an appearance to indicate data flow from the classical domain to the quantum domain, e.g., when configuration data is transmitted from the classical computing system 110 to the quantum computing system to be encoded in the qubits. The appearance of the quantum computing UI 170 on the other hand indicates that the computing job is waiting to be computed by the quantum computing system, or that the quantum computing system has not been configured for the computing job. FIG. 2B shows the quantum computing UI element 170 having an appearance indicating that the quantum computing system has been configured for the computing job (e.g., certain quantum gates have been implemented at specified qubits according to a quantum algorithm) and that quantum computation for the computing job is in progress. In some embodiments, the quantum computing UI element 170 may be animated to indicate progression of quantum computing, such that different rings in the UI element may be highlighted or illuminated to indicate different stages in quantum computing. FIG. 2C shows the quantum computing UI element 170 having an appearance indicating that the quantum computing system has completed computation for the computing job. The completion of the quantum computation may correspond to a measurement of one or more qubits being taken for the computing job.

Figure 2D:
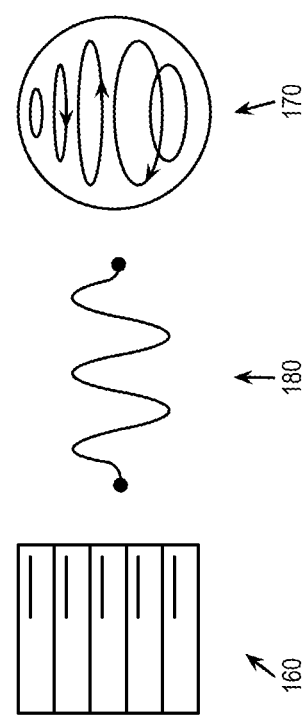

In some embodiments, the appearance of the data connection UI element 180 is used to indicate data flow from the classical computing domain to the quantum computing domain. In some embodiments, the appearance of the data connection UI element 180 is animated to indicate direction of the data flow. FIGS. 2A-D illustrate examples of altering the appearance of the data connection UI element 180 to represent data flow events in the quantum computing domain, consistent with an exemplary embodiment. FIG. 2A shows the data connection UI element 180 having an appearance (animated) to indicate data flow from the classical computing domain to the quantum computing domain for a computing job. FIG. 2B shows the data connection UI element 180 having an appearance to indicate data flow to the quantum computing domain is completed for the computing job as the animation stops. FIG. 2C shows the data connection UI element 180 having an appearance to indicate a quantum measurement result is being sent from the quantum computing domain to the classical computing domain. In some embodiments, the data connection UI element 180 may appear as a wiggly line or sinusoidal waves (i.e., pulses) to indicate data flow to the quantum domain (e.g., FIG. 2A) or transition from classical domain to the quantum domain. The data connection UI element 180 may appears as a straight line to indicate data flow to the classical domain (e.g., FIG. 2C) or no data flow. FIG. 2D shows an alternative appearance for the UI element 180, namely rectangular or square waves, for indicating data flow to the classical domain.

In some embodiments, the quantum computing interface system 105 presents other information as well. For example, in some embodiments, the interface system 105 provides an indication of the number of qubits used for the computing job in the quantum computing domain, or the number of qubits in quantum entanglement for the first computing job. In some embodiments, the interface system 105 may identify which qubits in the quantum computing system are used. The system may also provide information on the physical implementation of the qubits being used (e.g., polarization encoding, number of photons, time-bin encoding, superconducting charge/flux/phase qubit, etc.). The system may also provide information about the computing job itself, information such as the size of the job size, a description of the job, an expected wait time, and a percentage of job completed, etc.

In some embodiments, in addition to or instead of dispatching a computing job to the physical quantum computing system 120, the classical computing system 110 may also run a quantum computing simulator 190 (as a program or an application) that emulates the behavior of the quantum computing system 120 for the computing job. In some of these embodiments, the quantum computing interface system 105 presents an indication of whether computation in the quantum computing domain takes place in the quantum computing simulator or in the physical quantum computing system 120. In some embodiments, the quantum computing interface system 105 allows a selection between using the quantum computing simulator 190 or the physical quantum computing system 120 to perform the quantum domain computation.

In some embodiments, the UI elements 160, 170, and 180 are presented as selectable items by the quantum computing interface system 105. In some embodiments, the selection of an UI element corresponds to start or pause of a particular phase of the computing job, whether in classical domain or in quantum domain. In other words, the user may step through the computing job using the interface system 105.

FIG. 3A-J illustrate the quantum computing interface system through the progression of a computing job. The figures illustrate the visual presentation by the interface system 105, including changes of the appearances of the classical computing UI element 160, the quantum computing UI element 170, and the data connection UI element 180. The figures also illustrate using selection of the UI elements presented by the interface system 105 to start or pause a computing job, consistent with an exemplary embodiment.

Figure 3A:
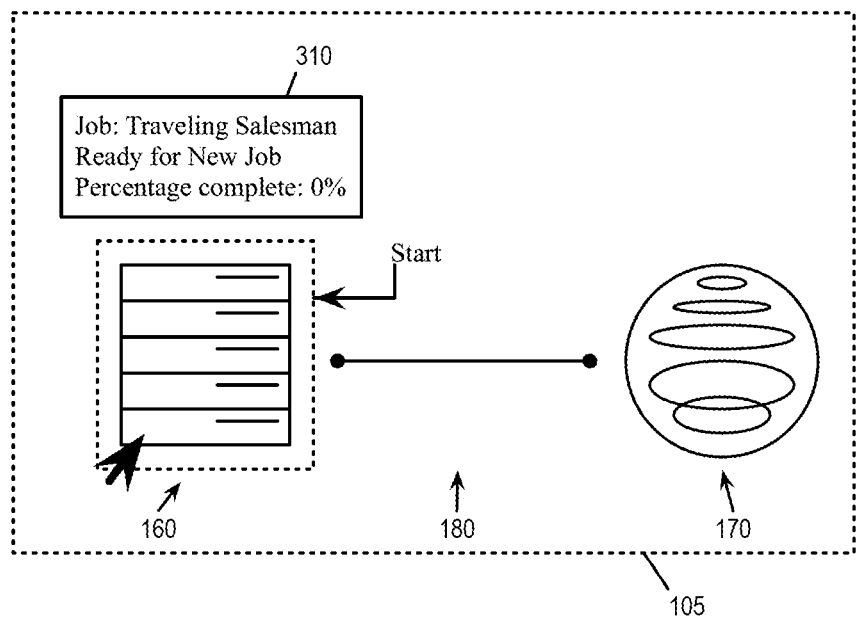
FIGS. 3A-J illustrate the quantum computing interface system through the progression of a computing job.

FIG. 3A shows the beginning of a computing job to be computed in the quantum domain. As illustrated, the data connection UI element 180 and the quantum computing UI element 170 shows no activity for the computing job. The quantum computing interface system 105 presents an indicator 310 that includes a description of the job ("traveling salesman"), a status of the computation ("ready for new job"), and a completion percentage (0%). The figure also shows the interface system 105 providing a visual prompt for the classical computing UI element 160 indicating that the UI element 160 can be selected to perform an action. The figure illustrates the UI element 160 as being selected, which is interpreted by the quantum computing interface system 105 as starting the computing job.

Figure 3B:
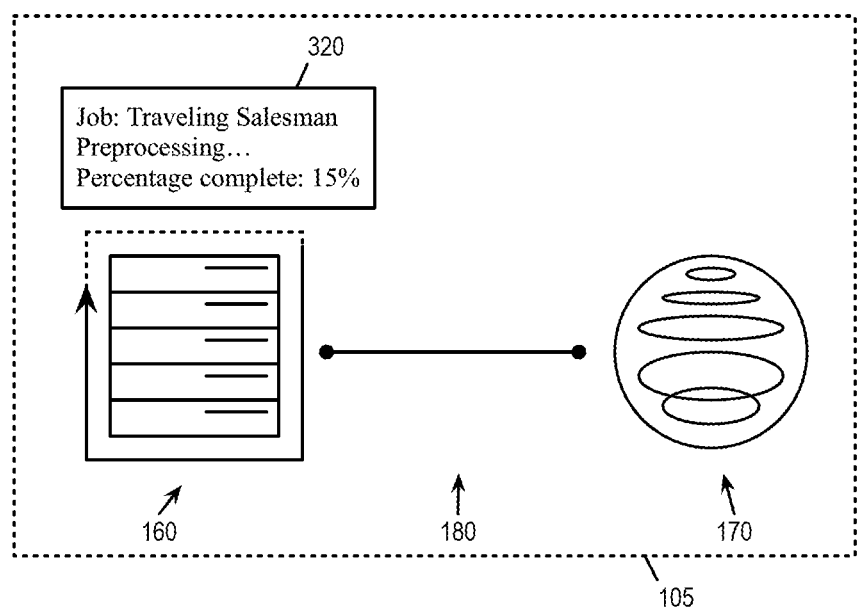

FIG. 3B shows classical computing UI element 160 changing appearance (being animated) to indicate preprocessing operations, e.g., generating configuration files for the quantum domain for the computing job. FIG. 3B also shows the quantum computing interface system 105 presenting a pop-up indicator 320 that shows the status of the computing job after the selection of the classical computing UI element 160, ("preprocessing . . . " and "15%").

Figure 3C:
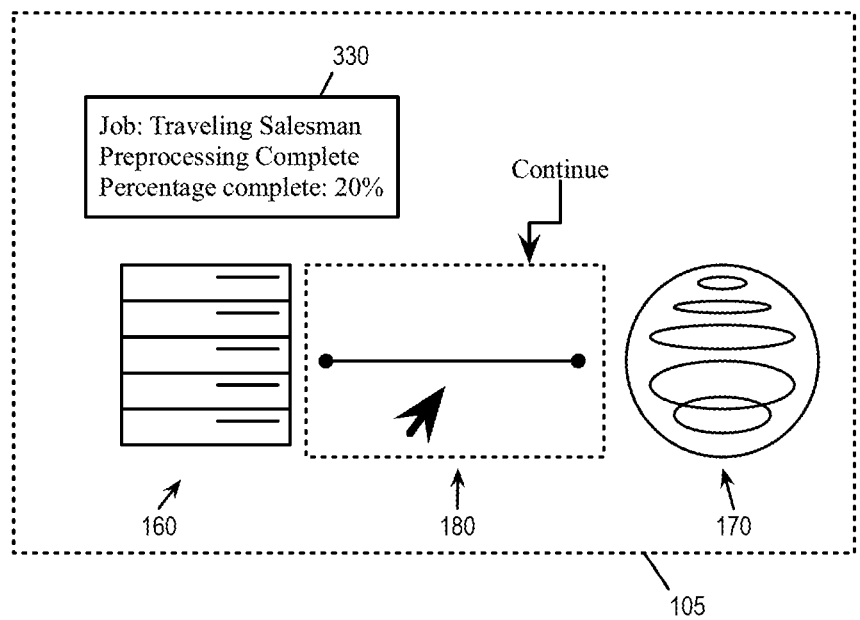

FIG. 3C shows the classical domain finishing preprocessing, as indicated by the appearance of the classical computing UI 160 (animation stopped). The figure also shows the interface system 105 providing a visual prompt for the data connection UI element 180 to indicate that the UI element 180 can be selected to perform an action, specifically to send data from the classical computing system 110 to the quantum computing system 120. The figure also shows the data connection UI element 180 being selected. The selection of the data connection UI element 180 starts process sending data from the classical computing system 110 to the quantum computing system 120.

Figure 3D:
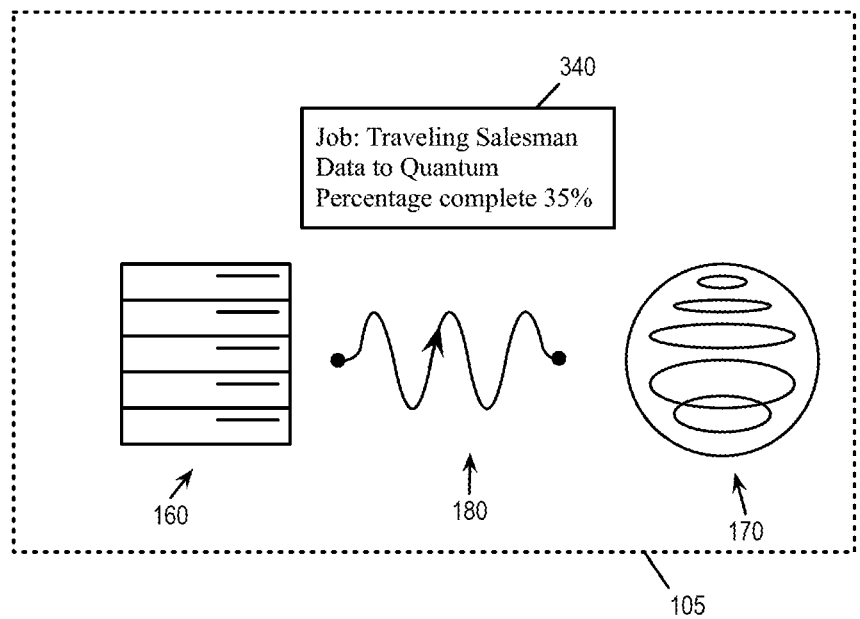

FIG. 3D shows the appearance of the data connection UI element 180 being changed (become a wiggly or sinusoidal line with animation) to indicate that data is being delivered to the quantum computing system 120 and transitioning from classical domain to the quantum domain.

Figure 3E:
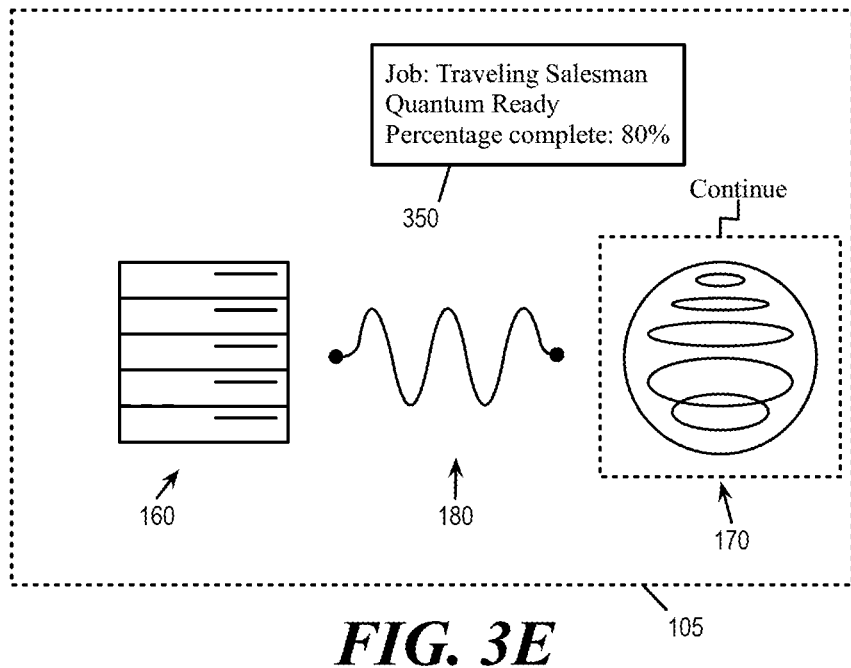

FIG. 3E shows the quantum computing interface system 105 indicating that the quantum computing system 120 is ready to be configured (a pop-up indicator 350 indicating "Quantum Ready"). The figure also shows the interface system 105 providing a visual prompt for the quantum computing UI element 170 to indicate that the UI element 170 can be selected to perform an action, namely to start computing in quantum domain. The figure also shows the quantum computing UI element 170 being selected, which is interpreted as proceeding to quantum computing for the computing job according to the configuration data.

Figure 3F:
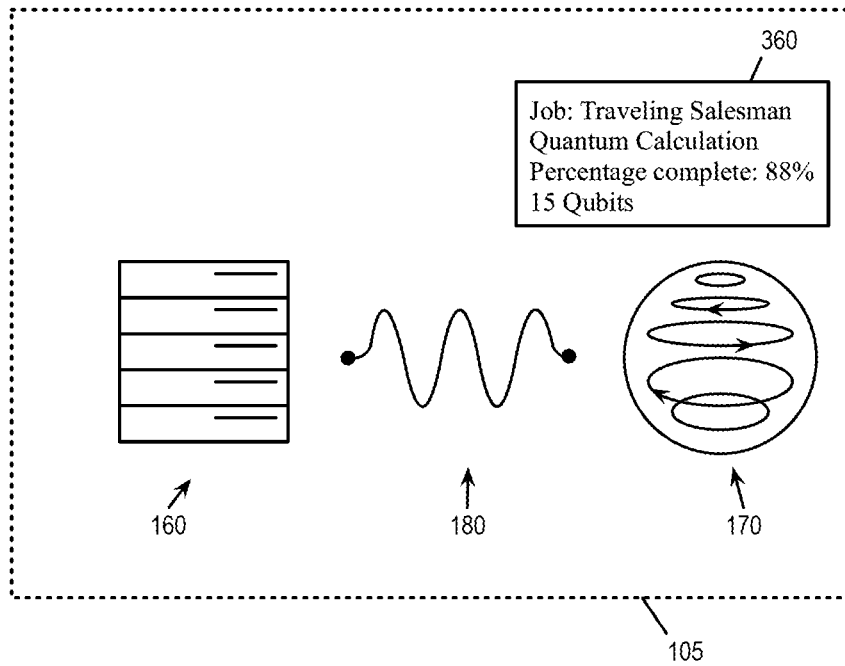
Figure 3G:
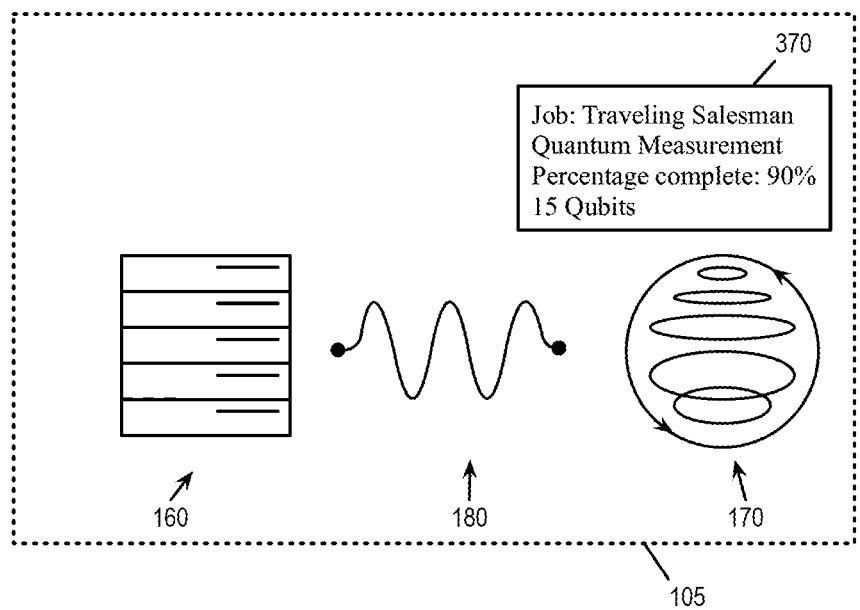

FIG. 3F shows the appearance of the quantum computing UI 170 being changed to indicate that the quantum computing system is performing quantum computation for the computing job (e.g., physically configuring the qubits and applying quantum gates according to the configuration data, etc.). A pop-up indicator 360 indicates that 15 Qubits are configured to be used for the computing job, and that the quantum calculation is taking place. The appearance of the quantum computing UI 170 also changes (being animated) to indicate that computation is taking place in the quantum domain, e.g., different rings in the UI element 170 may be highlighted or illuminated to indicate different stages in quantum computing FIG. 3G shows the appearance of the quantum computing UI element 170 being changed to indicate that the measurements of qubits is being taken for the computing job. The appearance of the quantum computing UI 170 also changes (being animated) to indicate that output of quantum computing is being generated (e.g., quantum measurements is taking place.) In some embodiments, an outermost ring of the quantum computing UI elements 170 is animated to indicate a final stage of quantum computing.

Figure 3H:
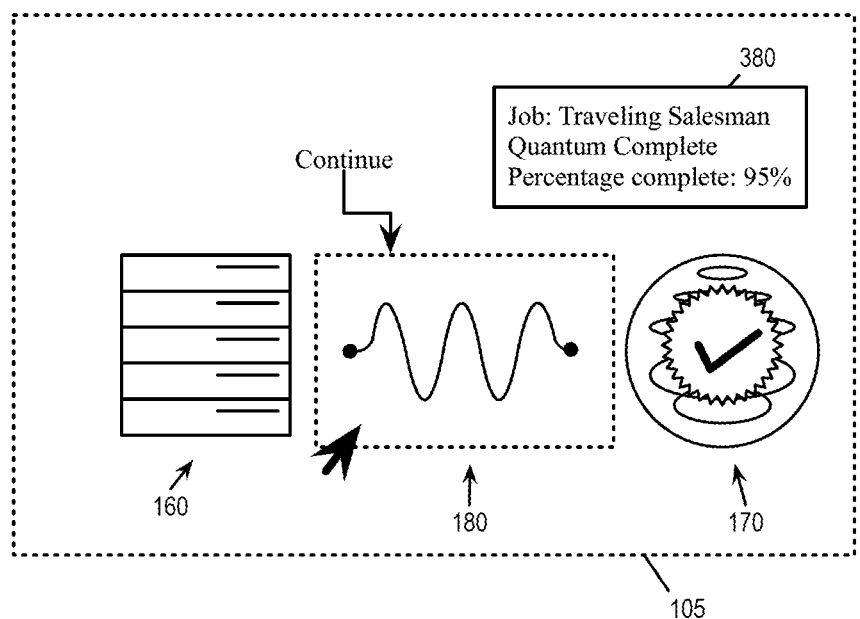

FIG. 3H shows the appearance of the quantum computing UI element 170 being changed to indicate that the quantum computation has completed. The figure also shows the interface system 105 providing a visual prompt for the data connection UI element 180 to indicate that the UI element 180 can be selected to perform an action, as data is ready to be transmitted back to the classical domain. The figure also shows the data connection UI element 180 being selected.

Figure 3I:
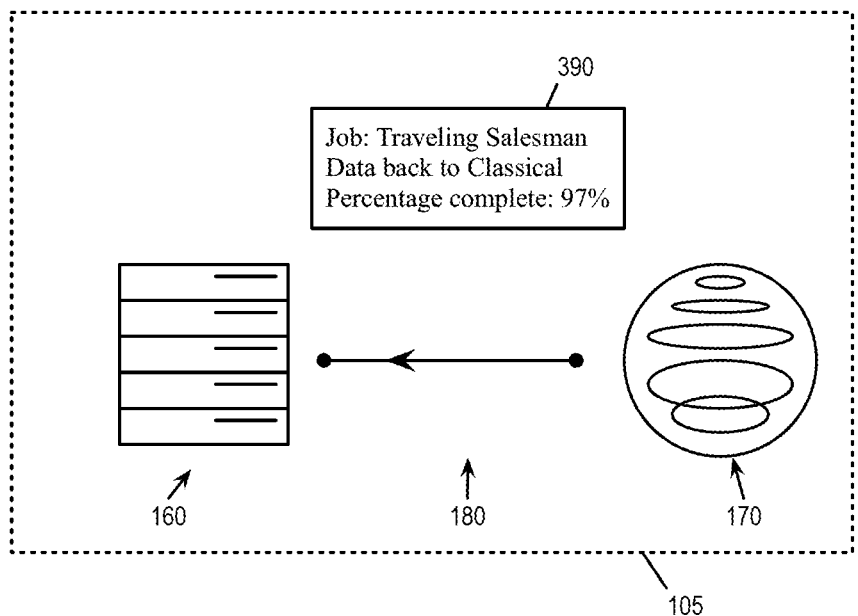
Figure 3J:
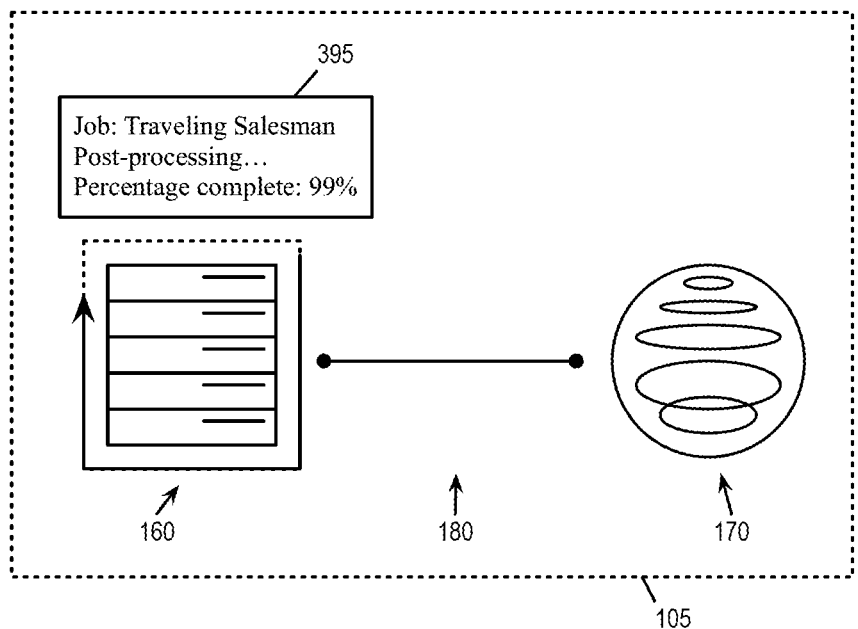

FIG. 3I shows the appearance of the data connection UI element 180 being changed (being animated) to indicate data is being transmitted from the quantum computing system 120 to the classical computing system 110. The data connection UI element 180 may appear as straight line or as a rectangular wave. FIG. 3J shows the appearance of the classical computing UI element 160 being changed (animated) to indicate data received from the quantum domain is being post-processed for the computing job.

In some embodiments, the quantum computing interface system 105 presents a queue of different computing jobs, where each member of the queue has at least three UI elements that correspond to the classical computing domain, the quantum computing domain, and the data connection between the classical computing domain and the quantum computing domain. The UI elements of each member are jointly used to show a status of a computing job to be performed in the quantum domain.

Figure 4:
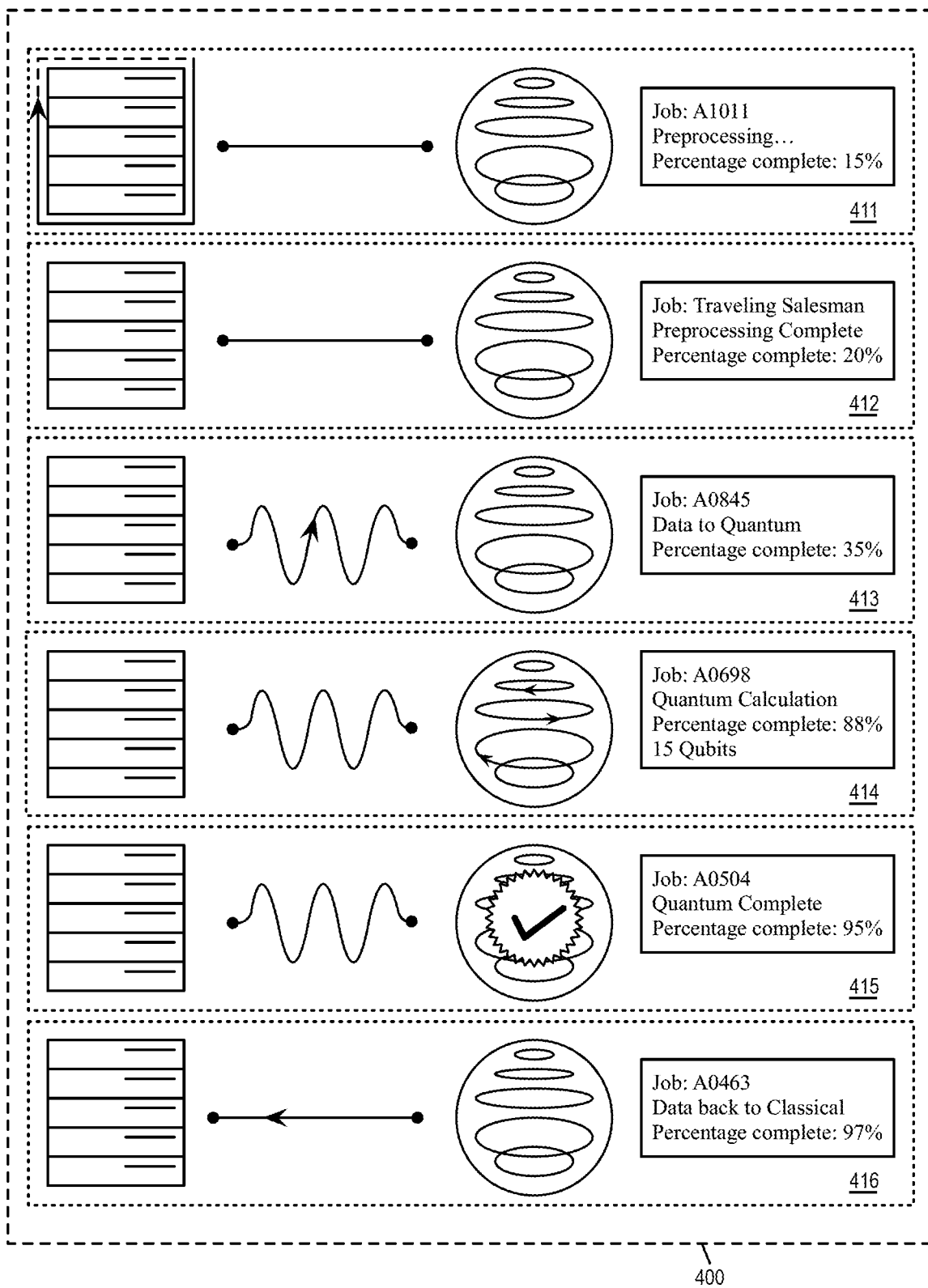
FIG. 4 illustrates the quantum computing interface system presenting a queue of different computing jobs, consistent with an exemplary embodiment.

FIG. 4 illustrates the quantum computing interface system 105 presenting a queue 400 of different computing jobs, consistent with an exemplary embodiment. As illustrated, the queue 400 has entries or members 411-416 that corresponds to several different computing jobs. Each queue member is a UI item that includes a classical computing UI item, a data connection UI item, and a quantum computing UI item.

In the example, the queue entry 411 represents a computing job that is being preprocessed by the classical computing system 110. The queue member 412 represent a computing job that has been preprocessed by the classical computing system 110 and is waiting for its turn to be sent to the quantum computing system 120. The queue member 413 represents a computing job whose data is being sent to the quantum domain. The queue member 414 represents a computing job that is currently being computed by the quantum computing system 120. The queue members 415 and 416 represent computing jobs that have finished quantum computing and are waiting for post-processing by the classical computing system 110.

Figure 5:
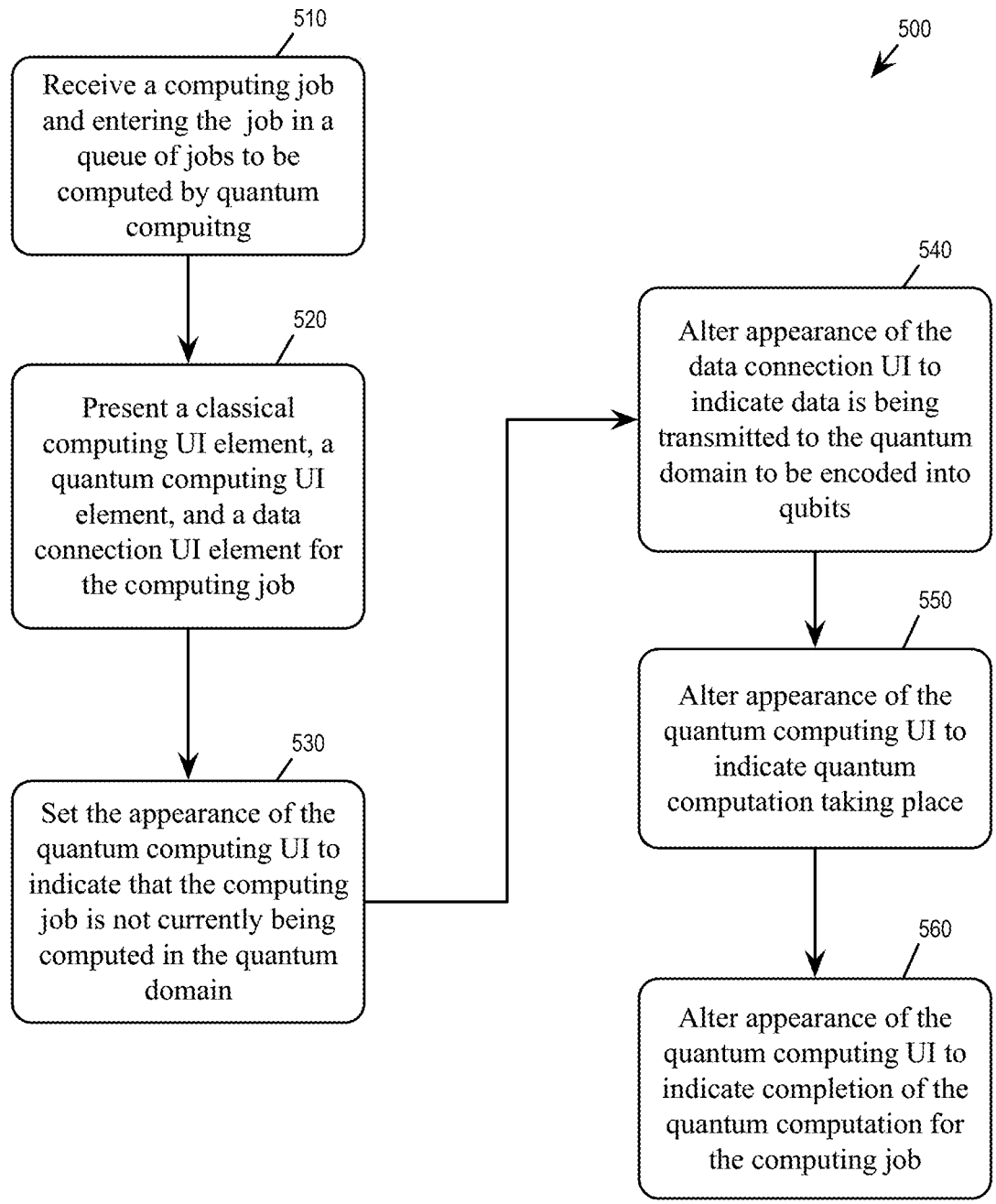
FIG. 5 conceptually illustrates a process for providing a user experience of the communication exchange between classical and quantum computing, consistent with an exemplary embodiment.

FIG. 5 conceptually illustrates a process 500 for providing a user experience of the communication exchange between classical and quantum computing, consistent with an exemplary embodiment. In some embodiments, one or more processing units (e.g., processor) of a computing device implementing the quantum computing interface system 105 perform the process 500 by executing instructions stored in a computer readable medium.

The quantum computing interface system 105 receives (at block 510) a computing job and entering the job in a queue of jobs to be computed by quantum computing.

The interface system presents (at block 520) (at a graphical user interface or GUI) a classical computing UI element (e.g., 160), a quantum computing UI element (e.g., 170), and a data connection UI element (e.g., 180) for the computing job. In some embodiments, a selection of the classical computing UI element is interpreted as starting the computing job. In some embodiments, the interface system presents an indication of whether computation in the quantum computing domain takes place in a quantum computing simulator or in a physical quantum computing device. In some embodiments, the interface allows a selection of whether computation in the quantum computing domain takes place in a quantum computing simulator or in a physical quantum computing device.

In some embodiments, the classical computing UI element includes one or more rectangular graphical elements and the quantum computing UI element includes one or more circular or elliptical elements (e.g., spheres or rings). In some embodiments, each line forming the classical computing UI element is a line without curvature and each line forming the quantum computing UI element has a curvature.

The interface system sets (at block 530) the quantum computing UI element to a default appearance to indicate that the computing job is not currently being computed in the quantum domain (e.g., FIG. 3A). The interface system may also set the data connection computing UI element to a default appearance to indicates that no data flow is occurring between the classical domain and the quantum domain for the computing job. In some embodiments, the data connection UI element appears as a straight line to indicate no data flow is taking place for the computing job between and classical and quantum domains. The system may also provide information on the physical implementation of the qubits being used (e.g., polarization encoding, number of photons, time-bin encoding, superconducting charge/flux/phase qubit, etc.). The system may also provide information about the computing job itself, information such as the size of the job, a description of the job, an expected wait time, and a percentage of job completed, etc.

The interface system alters (at block 540) the appearance of the data connection UI (e.g., 180) to indicate data from the classical domain being transmitted to the quantum domain to be encoded into qubits (e.g., FIG. 3D). In some embodiments, the interface system performs this operation when it receives a real-time signal indicating that configuration data for the quantum computing system is being transmitted via the data connection. In some embodiments, the data connection UI element appears as a sinusoidal wave or wiggly line to indicate data flow for the computing job or that data is transitioning from classical domain to the quantum domain. In some embodiments, a selection of the quantum computing UI element is interpreted as proceeding to quantum computing.

The system alters (at block 550) the appearance of the quantum computing UI to indicate quantum computation taking place or in progress. (e.g., FIG. 3F) In some embodiments, the interface system performs this operation when it receives a real-time signal indicating that the qubits in the quantum computing system have been configured according to the configuration data. In some embodiments, the interface system also provides an indication of a number of qubits used for the computing job. The interface system may also provide identification of qubits used. The interface system may also provide an indication of a number of qubits in quantum entanglement for the computing job. In some embodiments, the quantum computing UI elements is animated such that different rings in the UI element may be highlighted or illuminated to indicate different stages in quantum computing. In some embodiments, the outermost ring of the quantum computing UI elements is animated to indicate final stage of quantum computing (e.g., FIG. 3G). The system may also report a completion status of the computing job (e.g., percentage of job completion) and/or an error detected in the quantum computing domain or in the classical computing domain during execution of the computing job.

The system alters (at block 560) the appearance of the quantum computing UI to indicate the completion of the quantum computation for the computing job (e.g., FIG. 3H). In some embodiments, the interface system performs this operation when it receives a real-time signal indicating that the measurements of qubits have been taken for the computing job. The system may also alter the appearance of the data connection UI to indicate data flow from the quantum domain back to the classical domain by e.g., showing a straight line or a rectangular wave with animation toward the classical domain (e.g., FIG. 3I or FIG. 2D).

By providing UI elements that correspond to the classical computing domain, the quantum domain, and the data connection between the two domains, and by changing UI elements appearances to correspond to real-time events in the progression of a computing job to be processed in the quantum computing domain, the quantum computing interface system creates a common experience of the communication exchange between classical and quantum computing so that the process is visually understandable and recognizable to audiences who are not skilled in quantum computation.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 5) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
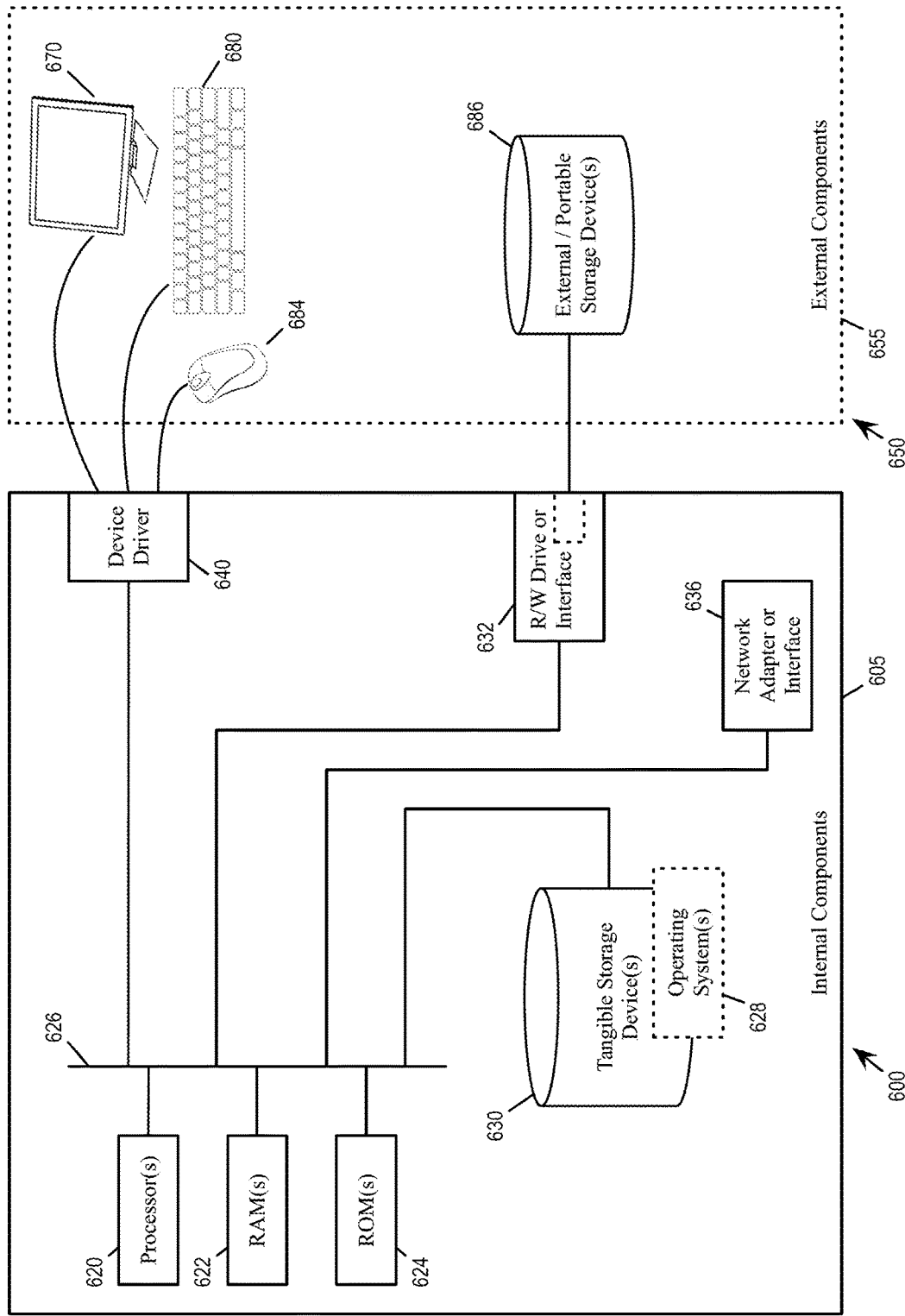
FIG. 6 shows a block diagram of the components of data processing systems that may be used to implement the quantum computing interface system in accordance with an illustrative embodiment of the present disclosure.

FIG. 6 shows a block diagram of the components of data processing systems 600 and 650 that may be used to implement the quantum computing interface system 105 in accordance with an illustrative embodiment of the present disclosure. It should be appreciated that FIG. 6 provides only an illustration of one implementation and does not imply any limitations with regard to the environments in which different embodiments may be implemented. Many modifications to the depicted environments may be made based on design and implementation requirements.

Data processing systems 600 and 650 are representative of any electronic device capable of executing machine-readable program instructions. Data processing systems 600 and 650 may be representative of a smart phone, a computer system, PDA, or other electronic devices. Examples of computing systems, environments, and/or configurations that may represented by data processing systems 600 and 650 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 600 and 650 may include a set of internal components 605 and a set of external components 655 illustrated in FIG. 6. The set of internal components 605 includes one or more processors 620, one or more computer-readable RAMs 622 and one or more computer-readable ROMs 624 on one or more buses 626, and one or more operating systems 628 and one or more computer-readable tangible storage devices 630. The one or more operating systems 628 and programs such as the programs for executing the process 500 are stored on one or more computer-readable tangible storage devices 630 for execution by one or more processors 620 via one or more RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

The set of internal components 605 also includes a R/W drive or interface 632 to read from and write to one or more portable computer-readable tangible storage devices 686 such as a CD-ROM, DVD, memory stick, magnetic tape, magnetic disk, optical disk or semiconductor storage device. The instructions for executing the process 500 can be stored on one or more of the respective portable computer-readable tangible storage devices 686, read via the respective R/W drive or interface 632 and loaded into the respective hard drive 630.

The set of internal components 605 may also include network adapters (or switch port cards) or interfaces 636 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 636. From the network adapters (or switch port adaptors) or interfaces 636, the instructions and data of the described programs or processes are loaded into the respective hard drive 630. The network may comprise copper wires, optical fibers, wireless transmission, routers, firewalls, switches, gateway computers and/or edge servers.

The set of external components 655 can include a computer display monitor 670, a keyboard 680, and a computer mouse 684. The set of external components 655 can also include touch screens, virtual keyboards, touch pads, pointing devices, and other human interface devices. The set of internal components 605 also includes device drivers 640 to interface to computer display monitor 670, keyboard 680 and computer mouse 684. The device drivers 640, R/W drive or interface 632 and network adapter or interface 636 comprise hardware and software (stored in storage device 630 and/or ROM 624).

The foregoing one or more embodiments implements a quantum computing interface system within a computer infrastructure by having one or more computing devices receiving real time signals from a classical computing system and a quantum computing system. The computer infrastructure is further used to present a graphical user interface (GUI) that includes UI elements that changes appearances based on real-time events related to a computing job to be processed by a quantum computing system.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of providing a visual representation of a status of a quantum-classical interface, the method comprising:
   presenting a first user interface (UI) element to represent a classical computing domain;
   monitoring a status of the classical computing domain in real-time;
   upon determining a first event physically occurring in real-time in the classical computing domain in a physical classical computing device, altering an appearance of the first UI element from its initial appearance;
   presenting a second UI element to represent a quantum computing domain;
   monitoring a status of the quantum computing domain;
   upon determining a second event physically occurring in real time in the quantum computing domain in a physical quantum computing device, altering an appearance of the second UI element in real-time from its initial appearance; and
   presenting a third UI element to represent a data connection between the classical computing domain and the quantum computing domain;
   monitoring a status of the data connection capturing a data flow between the classical computing domain and the quantum computing domain;
   upon determining a third event related to data transition between the classical computing domain and the quantum computing domain; altering an appearance of the third UI element from its initial appearance, wherein:
   wherein the first, second, and third UI elements are associated with a first computing job to be performed in the quantum domain, and the first, second, and third UI elements are jointly used to show a status of the first computing job,
   a first appearance of the third UI element indicates no data flow from the classical computing domain to the quantum computing domain for the first computing job,
   a second appearance of the third UI element indicates data being transmitted to the quantum computing domain to be encoded into qubits for the first computing job, and
   a third appearance of the third UI element indicate data being transmitted to the classical computing domain for the first computing job.

2. The method of claim 1, wherein the first UI element comprises one or more rectangular graphical elements and the second UI element comprises one or more circular or elliptical elements, wherein each line forming the first UI element is without curvature and each line forming the second UI element has a curvature.

3. The method of claim 1, further comprising presenting a queue of different computing jobs that includes the first computing job.

4. The method of claim 3, wherein:
   each member of the queue has at least three UI elements that correspond to the classical computing domain, the quantum computing domain, and the data connection between the classical computing domain and the quantum computing domain, and
   the UI elements of each member are jointly used to show a status of a computing job to be performed in the quantum domain.

5. The method of claim 1, further comprising providing an indication of a number of qubits used for the first computing job in the quantum computing domain.

6. The method of claim 1, further comprising providing an indication of a number of qubits in quantum entanglement for the first computing job.

7. The method of claim 1, further comprising reporting a completion status of the first computing job.

8. The method of claim 1, further comprising reporting an error detected in the quantum computing domain or in the classical computing domain during execution of the first computing job.

9. The method of claim 1, wherein:
a first appearance of the second UI element indicates the first computing job waiting to be computed in quantum domain,
a second appearance of the second UI element indicates a quantum computation for the first computing job in progress, and
a third appearance of the second UI element indicates a completion of the quantum computation for the first computing job.

10. The method of claim 9, wherein the completion of the quantum computation corresponds to a measurement of one or more qubits being taken for the first computing job.

11. The method of claim 1, wherein:
the second appearance of the third UI element comprises a sinusoidal wave to indicate a transition from the classical computing domain to the quantum computing domain, and
the third appearance of the third UI element comprises a straight line or a rectangular wave to indicate a transition from the quantum computing domain to the classical computing domain.

12. The method of claim 1, wherein a selection of the first UI element is interpreted as starting the first computing job.

13. The method of claim 1, wherein a selection of the second UI element is interpreted as proceeding to quantum computing for the first computing job.

14. The method of claim 1, wherein the second UI element is further configured to indicate whether an event takes place in a quantum computing simulator, and the method further comprising presenting an indication of whether a computation in the quantum computing domain takes place in the quantum computing simulator or in the physical quantum computing device.

15. The method of claim 1, further comprising allowing a selection of whether a computation in the quantum computing domain should take place in a quantum computing simulator or in the physical quantum computing device.

16. A computing device comprising:
a processor; and
a storage device storing a set of instructions, wherein an execution of the set of instructions by the processor configures the computing device to perform acts comprising:
presenting a first user interface (UI) element to represent a classical computing domain;
monitoring a status of the classical computing domain in real-time;
upon determining a first event physically occurring in real-time in the classical computing domain in a physical classical computing device, altering an appearance of the first UI element from its initial appearance;
presenting a second UI element to represent a quantum computing domain;
monitoring a status of the quantum computing domain;
upon determining a second event physically occurring in real time in the quantum computing domain in a physical quantum computing device, altering an appearance of the second UI element in real-time from its initial appearance; and
presenting a third UI element to represent a data connection between the classical computing domain and the quantum computing domain;
monitoring a status of the data connection capturing a data flow between the classical computing domain and the quantum computing domain;
upon determining a third event related to data transition between the classical computing domain and the quantum computing domain; altering an appearance of the third UI element from its initial appearance, wherein:
wherein the first, second, and third UI elements are associated with a first computing job to be performed in the quantum domain, and the first, second, and third UI elements are jointly used to show a status of the first computing job,
a first appearance of the third UI element indicates no data flow from the classical computing domain to the quantum computing domain for the first computing job,
a second appearance of the third UI element indicates data being transmitted to the quantum computing domain to be encoded into qubits for the first computing job, and
a third appearance of the third UI element indicate data being transmitted to the classical computing domain for the first computing job.

17. A computer program product comprising:
one or more non-transitory computer-readable storage devices and program instructions stored on at least one of the one or more non-transitory storage devices, the program instructions executable by a processor, the program instructions comprising sets of instructions for:
presenting a first user interface (UI) element to represent a classical computing domain;
monitoring a status of the classical computing domain in real-time;
upon determining a first event physically occurring in real-time in the classical computing domain in a physical classical computing device, altering an appearance of the first UI element from its initial appearance;
presenting a second UI element to represent a quantum computing domain;
monitoring a status of the quantum computing domain;
upon determining a second event physically occurring in real time in the quantum computing domain in a physical quantum computing device, altering an appearance of the second UI element in real-time from its initial appearance; and
presenting a third UI element to represent a data connection between the classical computing domain and the quantum computing domain;
monitoring a status of the data connection capturing a data flow between the classical computing domain and the quantum computing domain;
upon determining a third event related to data transition between the classical computing domain and the quantum computing domain; altering an appearance of the third UI element from its initial appearance, wherein:
wherein the first, second, and third UI elements are associated with a first computing job to be performed in the quantum domain, and the first, second, and third UI elements are jointly used to show a status of the first computing job,
a first appearance of the third UI element indicates no data flow from the classical computing domain to the quantum computing domain for the first computing job, a second appearance of the third UI element indicates data being transmitted to the quantum computing domain to be encoded into qubits for the first computing job, and
a third appearance of the third UI element indicate data being transmitted to the classical computing domain for the first computing job.

* * * * *